United States Patent
Wanda et al.

(10) Patent No.: US 7,808,450 B2
(45) Date of Patent: Oct. 5, 2010

(54) IMAGE PROCESSING METHOD AND IMAGE PROCESSING APPARATUS

(75) Inventors: Koichiro Wanda, Yokohama (JP); Toshikazu Ohshima, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 834 days.

(21) Appl. No.: 11/400,000

(22) Filed: Apr. 7, 2006

(65) Prior Publication Data

US 2006/0273984 A1     Dec. 7, 2006

(30) Foreign Application Priority Data

Apr. 20, 2005   (JP)   ............................. 2005-122369

(51) Int. Cl.
 *G09G 5/00* (2006.01)
(52) U.S. Cl. .......................................... 345/8; 345/633
(58) Field of Classification Search ................. 345/7–9, 345/633
See application file for complete search history.

(56) References Cited

U.S. PATENT DOCUMENTS

| | | | |
|---|---|---|---|
| 5,574,469 A | * | 11/1996 | Hsu ............................ 342/455 |
| 6,057,856 A | * | 5/2000 | Miyashita et al. ............ 345/633 |
| 6,064,335 A | * | 5/2000 | Eschenbach ............ 342/357.06 |
| 7,190,378 B2 | * | 3/2007 | Sauer et al. .................. 345/633 |
| 7,394,459 B2 | * | 7/2008 | Bathiche et al. ............. 345/175 |
| 2002/0101568 A1 | * | 8/2002 | Eberl et al. .................. 351/211 |
| 2002/0154128 A1 | * | 10/2002 | Zachmann .................. 345/474 |
| 2004/0066417 A1 | | 4/2004 | Anabuki |

FOREIGN PATENT DOCUMENTS

JP      09297620      * 11/1997
JP      2004-127024 A   4/2004

* cited by examiner

*Primary Examiner*—Amr Awad
*Assistant Examiner*—Jonathan Boyd
(74) *Attorney, Agent, or Firm*—Canon U.S.A. Inc., I.P. Division

(57) ABSTRACT

When a plurality of mixed reality (MR) experiencing persons experience the same mixed reality, there is a possibility that the experiencing persons come into contact with one another. An image processing apparatus capable of reporting to the MR experiencing persons that there is a possibility of contact. Therefore, a real space image that is image captured from the position and orientation of a user's viewpoint is drawn. The position and orientation of the user's viewpoint at this time is detected by a sensor unit. It is determined whether or not the viewpoint position is smaller than or equal to an attention distance at which there is a possibility of contact. If the viewpoint position is smaller than or equal to the attention distance, an attention display for this fact is performed.

8 Claims, 7 Drawing Sheets

IMAGE PROCESSING METHOD AND IMAGE PROCESSING APPARATUS

BACKGROUND OF THE INVENTION

1. Field of the Invention

The present invention relates to an image processing method and an image processing apparatus, and more particularly, relates to an image processing method in which, while a mixed reality (MR) is being displayed, when positions of a plurality of users come close to one another, this fact is reported to the users.

2. Description of the Related Art

In recent years, apparatuses to which mixed reality technology for naturally combining a real space with a virtual reality without causing an unnatural sensation is applied have been proposed.

These mixed reality apparatuses combine an image of a virtual reality drawn by computer graphics (CG) with an image of a real space, which is taken by an imaging device such as a camera, and display the combined image on a display apparatus such as a head-mounted display (HMD), thus displaying the mixed reality to a user of the apparatus (refer to, for example, Japanese Patent Laid-Open No. 2004-127024).

In order to generate an image of a virtual reality in such a manner as to follow changes in an image of a real space and in order to increase a mixed reality, these mixed reality apparatuses need to obtain the position and orientation of the viewpoint of the user of the apparatus in real time and to display the image on a display apparatus such as an HMD in real time with respect to the user.

In a mixed reality apparatus, the viewpoint position and orientation of the user, which is measured by a sensor device, is set as the virtual viewpoint position and orientation in a virtual reality, an image of the virtual reality is drawn by CG on the basis of this setting, and the image of the virtual reality is combined with the image of the real space.

In the HMD, for the purpose of displaying a mixed reality, a display of a display apparatus of the HMD is contained in the visual field of the user of the mixed reality apparatus and an area for drawing CG is contained within the display of the display apparatus of the HMD. For this reason, the user of the mixed reality apparatus can observe an image such that, as it were, a virtual object exists within the real space. However, an area that obstructs the real space exists by an amount corresponding to the display apparatus of the HMD and the drawing of CG with respect to the field of view of the real space that should enter the original field of view of the user of the mixed reality apparatus, and thus the field of view of the user in the real space is narrowed. In particular, when a user who experiences a plurality of mixed realities experiences the mixed realities at the same time, CG obstructs another user and an object of the real space, and contact due to the approach of the user and the effects of the mixed reality might be deteriorated.

In such a situation, among users of mixed reality apparatuses, a user who experiences a mixed reality by using an HMD has no means for knowing the state in which the user comes closer to another user and an object. Furthermore, an operator for providing a mixed reality by using a mixed reality apparatus has no means for accurately knowing the approaching state of a plurality of HMD users. In addition, there is no method of knowing the state of the user experiencing the mixed reality for the purpose of effectively avoiding the contact including the physique of the user and a movable area, such as the hand of the user.

SUMMARY OF THE INVENTION

The present invention provides an image processing method and an image processing apparatus in which, while a mixed reality (MR) is being displayed, this fact is reported to the users.

The present invention provides an image processing method and an image processing apparatus in which, while a mixed reality (MR) is being displayed, the possibility of contact due to proximity between a plurality of users wearing an HMD of mixed reality apparatuses and due to proximity of the head part of the user wearing an HMD and of moving areas such as the hand of the user and the offset position of a sensor, is reported to an operator, so that the contact of the user is avoided.

According to an aspect of the present invention, there is provided an image processing method including: taking a real space image observed from the position and orientation of a user's viewpoint; detecting the position and orientation of the user's viewpoint; generating a combined image by combining computer graphics (CG) based on the position and orientation of the viewpoint with the real space image; displaying the combined image to the user; measuring the distance between a plurality of users; determining whether the distance between the plurality of users becomes smaller than or equal to a predetermined value; and reporting that a different user approaches the user when it is determined that the distance between the plurality of users becomes smaller than or equal to the predetermined value.

According to another aspect of the present invention, there is provided an image processing method including: detecting positions and orientations of the viewpoints of a plurality of users; displaying a computer graphics (CG) image to each user based on the position and orientation of the viewpoints of each of the users; identifying a measurement object for each user; setting an area for each measurement object identified; computing the distance for each of the set areas; determining whether the computed distance becomes smaller than or equal to a predetermined value; and reporting to the user that there is a possibility of contact when it is determined that the computed distance becomes smaller than or equal to the predetermined value.

According to another aspect of the present invention, there is provided an image processing apparatus including: an imaging unit configured to take a real space image observed from the position and orientation of a user's viewpoint; a detection unit configured to detect the position and orientation of the user's viewpoint; a combining unit configured to generate a combined image by combining computer graphics (CG) based on the position and orientation of the viewpoint with the real space image; a display unit configured to display the combined image to the user; a measurement unit configured to measure distances between a plurality of users; a determination unit configured to determine whether the distance measured by the measurement unit becomes smaller than or equal to a predetermined value; and a reporting unit configured to report that another user approaches the other user when it is determined by the determination unit that the distance becomes smaller than or equal to the predetermined value.

According to yet another aspect of the present invention, there is provided an image processing apparatus including: a detection unit configured to detect positions and orientations of the viewpoints of a plurality of users; a display unit configured to display a computer graphics (CG) image to each user based on the position and orientation of the viewpoints of each of the users; an identification unit configured to identify a measurement object for each user; a setting unit configured to set an area for each measurement object identified by the identification unit; a computation unit configured to compute the distance for each of the areas set by the setting unit; a determination unit configured to determine whether the distance computed by the computation unit becomes smaller than or equal to a predetermined value; and a reporting unit configured to report to the user that there is a possibility of contact when it is determined by the determination unit that the distance computed by the computation becomes smaller than or equal to the predetermined value.

Other features of the present invention will be apparent from the following description taken in conjunction with the accompanying drawings, in which like reference characters designate the same or similar parts throughout the figures thereof.

DESCRIPTION OF THE EMBODIMENTS

Exemplary embodiments of the present invention will now be described below with reference to the drawings.

Figure 1:
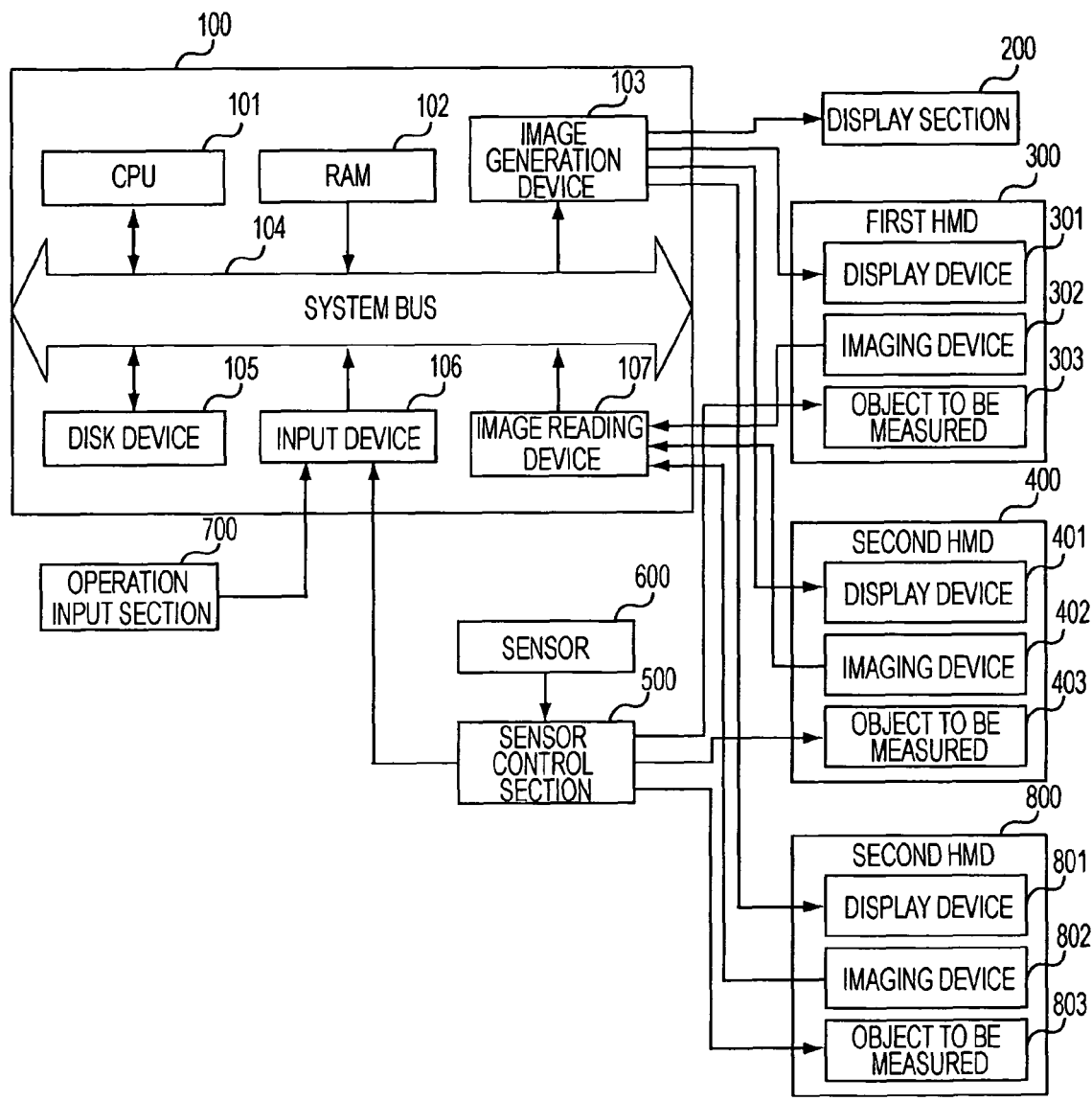
FIG. 1 is a block diagram showing an exemplary configuration of an image processing apparatus.

FIG. 1 is a block diagram showing an exemplary configuration of a mixed reality apparatus.

In FIG. 1, a computation unit 100 includes a computer, and the like. The computation unit 100 is formed of a CPU (central processing unit) 101, a RAM (random access memory) 102, an image generating unit 103, a system bus 104, a disk unit 105, an input unit 106, and an image reading unit 107.

The CPU 101 controls a mixed reality process on the basis of a mixed reality program stored in a ROM (read only memory) (not shown) or the RAM 102. The CPU 101 can mutually communicate with and control devices, such as the RAM 102, the image generating unit 103, the disk unit 105, the input unit 106, and the image reading unit 107 via the system bus 104.

The RAM 102 is realized by a main storage device such as a memory, and temporarily stores program code of a mixed reality program, program control information, CG data, and measured position data via the system bus 104.

The image generating unit 103 is realized by a device such as a graphics card. In general, the image generating unit 103 holds a graphics memory (not shown). Image information generated in accordance with a program performed by the CPU 101 is written into a graphics memory held by the image generating unit 103 via the system bus 104. The image generating unit 103 converts the image information written into the graphics memory into an image signal in compliance with the display apparatus, and sends out the image signal to a display unit 200, and display apparatuses 301, 401, and 801.

The graphics memory does not necessarily need to be held by the image generating unit 103, and the functions of the graphics memory may be realized by the RAM 102.

The system bus 104 is a communication path through which devices of the computation unit are connected and communicate with one another.

The disk unit 105 is realized by an auxiliary storage device, such as a hard disk. The disk unit 105 holds program code of a mixed reality program, program control information, CG object data of a virtual reality, position data of an HMD, attention distance information, and so forth.

The input unit 106 is realized by various interface devices. For example, the input unit 106 realizes functions for inputting, as data, a signal from a device that is connected externally to the computation unit 100 and for writing the data into the RAM 102 via the system bus 104.

The image reading unit 107, like a capture card, inputs an image signal, such as a video image, and writes image data into the RAM 102 or a graphics memory via the system bus 104. When an HMD 300, 400, and/or 800 is an optical see-through HMD, the image reading unit 107 does not need to be provided.

The display unit 200 is, for example, a display apparatus, such as a cathode ray tube (CRT) or a liquid-crystal display (LCD), and displays the operating status of a mixed reality presentation apparatus and the position information of the HMD with respect to the user (each user of the first HMD 300, the second HMD 400, and the third HMD 800) of the mixed reality presentation apparatus.

The first HMD 300, the second HMD 400, and the third HMD 800 are HMDs worn by the users of this apparatus in order to experience the mixed reality apparatus of this embodiment. The number of HMDs is not limited to three, and may be two, four or more.

The first HMD 300 is formed of a display apparatus 301, an imaging device 302, and a measurement object 303. The second HMD 400 is formed of a display apparatus 401, an imaging device 402, and a measurement object 403. The third HMD 800 is formed of a display apparatus 801, an imaging device 802, and a measurement object 803.

In exemplary embodiments, the first HMD 300, the second HMD 400, and the third HMD 800 are described as being the same type of HMD, but do not necessarily need to be the same type of HMD. Any device that can specify the position of the user in the same manner as in the HMD may make a determination as to the attention distance on the basis of the position relationship between an object other than the HMD and the HMD.

For example, the HMD may be a video see-through HMD. Alternatively, the HMD may be an optical see-through HMD. In that case, the imaging devices 302, 402, 802 are not necessary. In the following, a case of two HMDs 300 and 400 will be described.

The display apparatuses 301 and 401 are realized by, for example, a display unit of a video see-through HMD. The display apparatuses 301 and 401 are used to display an image signal sent out from the image generating unit 103 and to display a mixed reality to the user.

The imaging devices 302 and 402 are used to take an image of the real space, which is viewed from the viewpoint of the user of each HMD. The taken image is sent out as an image signal to the image reading unit 107.

The measurement objects 303 and 403 are measurement objects necessary for a sensor 600 to recognize the position of each HMD, and are provided on the HMD.

The sensor 600 measures the position and orientation of the user. A sensor control unit 500 controls the sensor 600 and obtains observation data from the measurement objects 303 and 403 and the sensor 600. On the basis of the observation data, the sensor control unit 500 computes the position and orientation information of the measurement objects 303 and 403, and transmits the position and orientation information as measured values to the input unit 106.

In exemplary embodiments of the present invention, the measurement objects 303 and 403, the sensor control unit 500, and the sensor 600 can be applied even if they have a different configuration depending on the type of sensor.

As an optical example, the measurement objects 303 and 403 of the optical sensor OPTOTRAK 3020 of Northern Digital, Inc. are formed of a light-emitting device, and emit light under the control of the sensor control unit 500. The sensor 600 is formed of a photo-receiving device and observes light emitted from the light-emitting device of the measurement objects 303 and 403. The sensor control unit 500 computes observation data of the sensor 600 and the position and orientation of the measurement objects 303 and 403.

In another example of an optical sensor, in the case of the optical sensor HiBall of 3rdTech, Inc., the measurement objects 303 and 403 are formed of a photo-receiving device and the sensor 600 is formed of a light-emitting device. The sensor 600 emits light under the control of the sensor control unit 500. The measurement objects 303 and 403 observe light emitted from the sensor 600. The sensor control unit 500 computes the position and orientation of the measurement objects 303 and 403 on the basis of the observation data of the measurement objects 303 and 403 and the arrangement data of the sensor 600.

In addition, as an example of a magnetic sensor, in the case of the magnetic sensor Fastrak of Polhmus, Co., the measurement objects 303 and 403 are formed of receivers, a magnetic field generated by a transmitter of the sensor 600 is observed, observation data is generated. The sensor 600 is formed of a transmitter and generates a magnetic field under the control of the sensor control unit 500. The sensor control unit 500 computes the position and orientation of the measurement objects 303 and 403 on the basis of the observation data of the measurement objects 303 and 403.

It is possible to apply a technique in which the user wears a marker, image processing is performed on an image taken by another imaging device differing from the imaging device that is installed on the HMD, the marker is extracted from within the image, and the position and orientation of the HMD of the user is computed from the position of the marker in the image of the marker.

In this case, exemplary configurations include a configuration in which the measurement objects 303 and 403 are markers, the sensor 600 is an imaging device, and the sensor control unit 500 is an image processing section. Furthermore, it is also possible to apply a technique in which a marker is not attached to the measurement objects 303 and 403, the imaging device takes the user of this apparatus, and the position and orientation of the user is computed by using the image features of the user. In this case, the measurement objects 303 and 403 correspond to the user of this apparatus.

In addition, a method for installing a plurality of markers serving as landmarks in the space where this apparatus is used, performing image processing on an image taken by the imaging devices 302 and 402, and computing the position and orientation of the user of this apparatus from the position of the marker in the image can be applied. Also, a method for extracting the position and orientation of the user of this apparatus by extracting image features from an image taken by the imaging device without installing explicit markers as landmarks in the space where this apparatus is used can be applied.

Measurement of the position and orientation of the user of this apparatus by using both a plurality of sensors and a measurement method, and measurement of only the position can be applied to this embodiment.

First Embodiment

Figure 4:
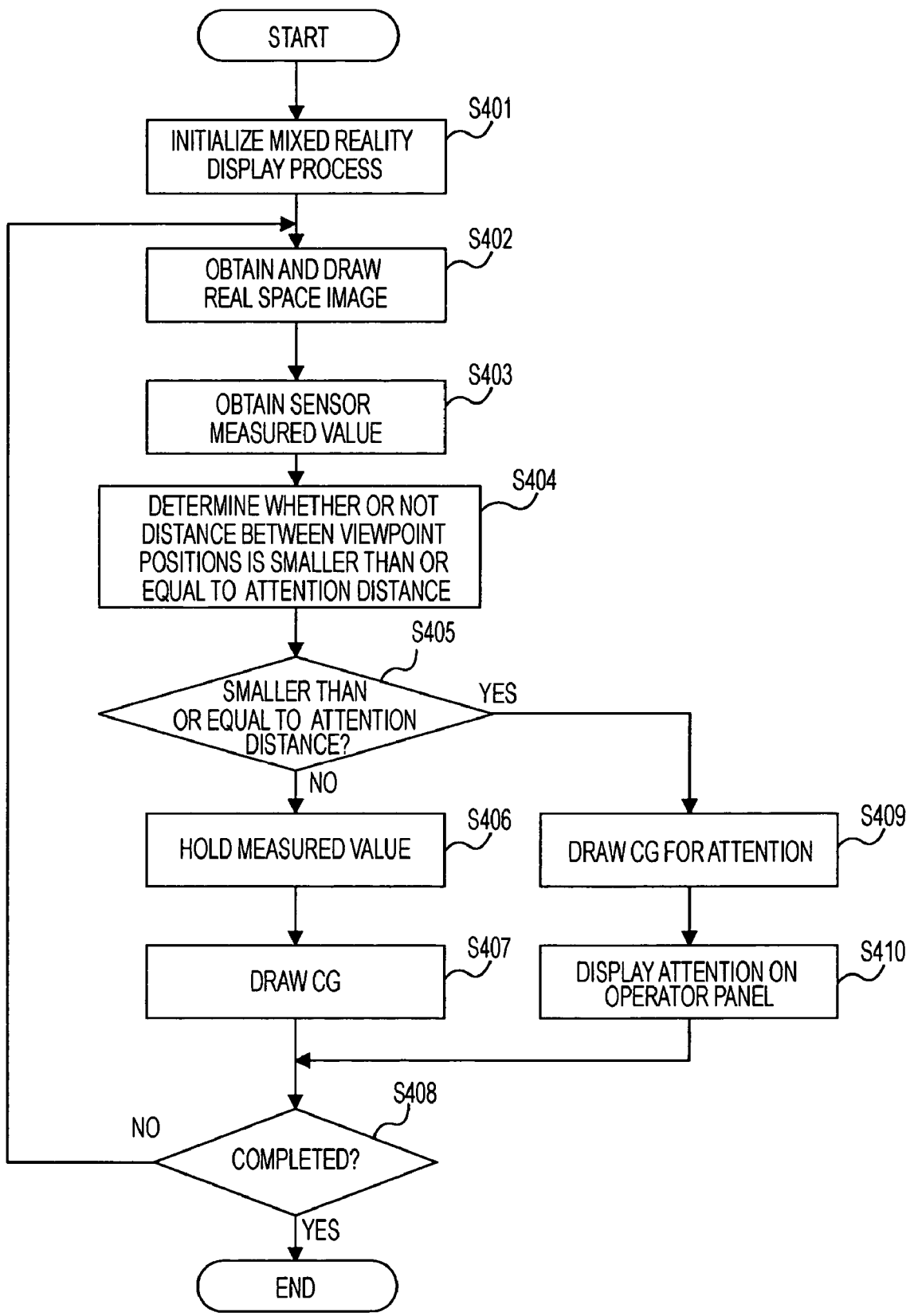
FIG. 4 is a flowchart showing a processing procedure according to the first and second embodiments of the present invention.

FIG. 4 is a flowchart showing a processing procedure according to a first embodiment of the present invention.

In the first embodiment, an example in which a determination as to proximity is performed by using only the distance between users, which is measured by a sensor, will be described in detail with reference to the flowchart in FIG. 4.

In step S401, an initialization process for a mixed reality presentation process is performed. For the initialization process, for example, a CPU 101 reads data, such as virtual reality CG object data, CG object data for report, attention distance data, and program control data, from a disk unit 105 into the RAM 102.

In step S402, an image reading unit 107 inputs a real space image from an HMD of a user of this apparatus, which is taken by the imaging devices 302 and 402, and writes the real space image into the RAM 102. The CPU 101 reads the image from the RAM 102, performs a correction process as necessary, and thereafter, writes the image into a frame buffer in a graphics memory of an image generating unit 103. The image input by the image reading unit 107 may be directly written into the frame buffer of a graphics memory of the image generating unit 103 without the use of the RAM 102.

When an optical see-through display apparatus is used for a display apparatus 201, the process of step S402 does not need to be performed.

In step S403, the input unit 106 obtains a measured value output by a sensor control unit 500 of a sensor unit 600. The CPU 101 converts the obtained measured value into the position and orientation at the viewpoint of the user of this apparatus and writes them into the RAM 102. Furthermore, in step S403, the CPU 101 reads, from the disk unit 106, a boundary measured value (measured value in a sensor measurable range or in a user movable range) measured by a boundary measured value collection process (process for collecting a value in a sensor measurable range or in a user movable range) in step S401, and stores the boundary measured value in the RAM 102.

Figure 2:
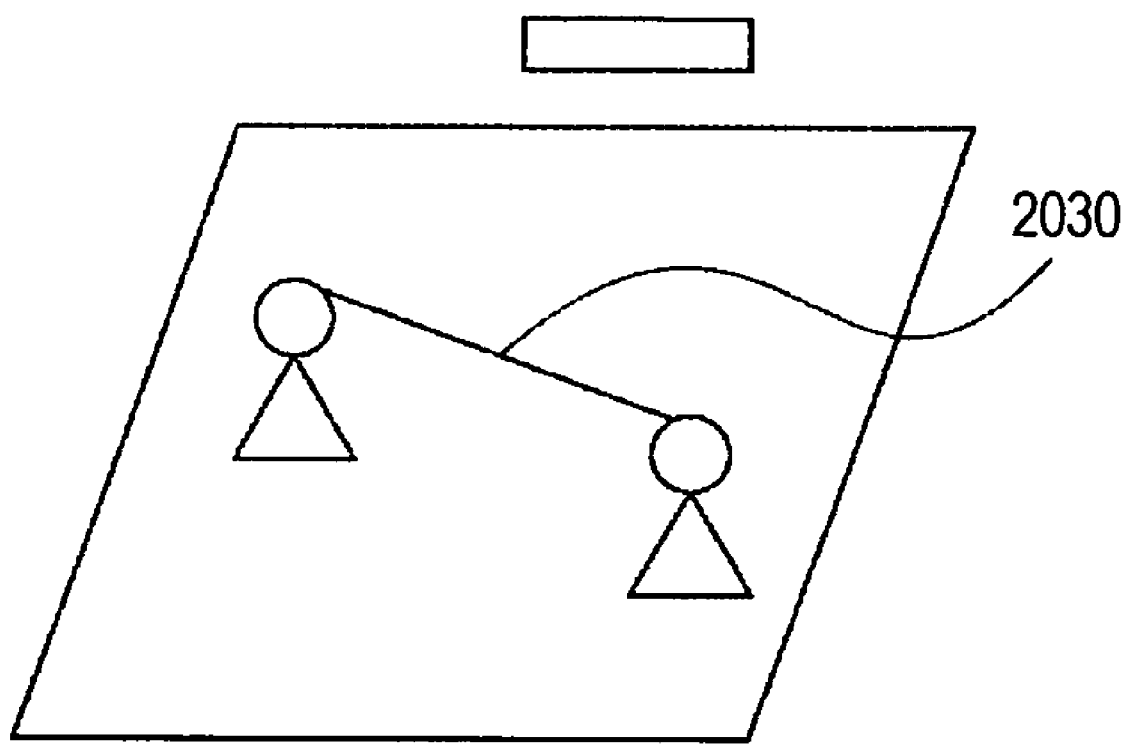
FIG. 2 shows the concept of an attention distance according to a first embodiment of the present invention.

In step S404, the CPU 101 compares the viewpoint position of the user of this apparatus, which is converted in step S403, with a group of a plurality of boundary measured values stored in the RAM 102 in order to determine whether or not the distance 2030 between the HMDs of a first HMD 300 and a second HMD 400 (see FIG. 2) is smaller than or equal to an attention distance.

When it is determined in step S405 that the distance between the HMDs, which is computed from the positions of the first HMD 300 and the second HMD 400 of the user of this apparatus, which is determined in step S404, is smaller than or equal to an attention distance that is set in advance in the system, the process proceeds to a process for performing an attention display.

If the distance is smaller than or equal to an attention distance, the process proceeds to step S409, where the CPU 101 displays a CG object for attention, which is read in advance into the RAM 102, on the display apparatuses 301 and 401, thereby reporting this fact to the user. For example, "Be careful: Possibility of coming into contact with another user" is displayed at a predetermined position (e.g., the central portion, etc.) of each of the display apparatuses 301 and 401.

Figure 3:
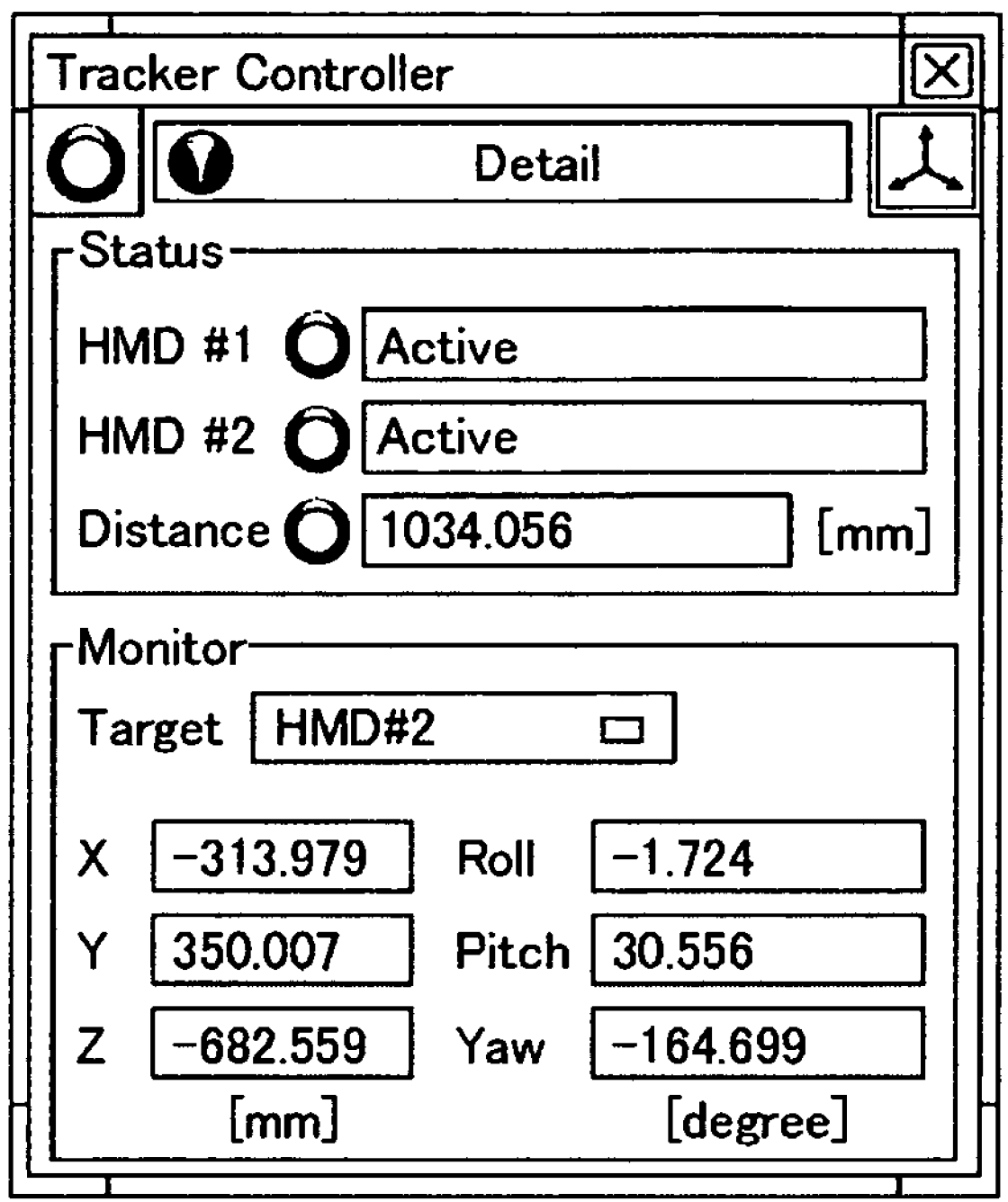
FIG. 3 shows an example of a display for an operator of an image processing apparatus.

Next, in step S410, the CPU 101 displays, on a display unit 200, for example, a GUI (Graphical User Interface) of an operator panel shown in FIG. 3, which is read in advance into the RAM 102, and displays the distance between the first HMD 300 and the second HMD 400. Also, attention display is performed in such a manner that, if the distance between the first HMD 300 and the second HMD 400 is smaller than or equal to a certain value (e.g., 1 m (1000 mm)), the color of the icon is made to be a certain color, e.g., orange, and if the distance is smaller than or equal to 50 cm, the color of the icon is made to be a different color, e.g., red.

For these attention displays, another method of display may be used as long as the display is a display indicating that another user exists at a distance that is smaller than or equal to an attention distance, such as an animation display, or the drawing of a CG in the vicinity of the HMD of the user who exists is smaller than or equal to the attention distance being erased.

For a threshold value of the attention distance used for the determination, on the basis of the position and orientation of the user, a different value may be used depending on the orientation, the moving direction, and the speed. After displaying attention on the operator panel (step S410), processing proceeds to step S408.

When it is determined in step S405 that the distance is not smaller than or equal to the attention distance, in step S406, the measured value is held (stored in the RAM 102), and the process then proceeds to step S407.

In step S407, the CPU 101 reads the data of a CG object of the virtual reality from the RAM 102, draws CG from the computed viewpoint position and orientation of the user of this apparatus, and outputs it into the graphics memory. The image generating unit 103 combines the data drawn in various buffers of the graphics memory and sends out an image signal to the display apparatuses 301 and 401. Processing then proceeds to step S408.

In step S408, a determination is made as to the continuation of the mixed reality presentation process, i.e., whether the process has been completed. When the mixed reality presentation process should be continued, the process returns to step S402. When the mixed reality presentation process should be terminated, the mixed reality presentation process of the present invention is completed.

As described above, according to the embodiment of the present invention, when the distance between a plurality of persons having an HMD installed becomes smaller than or equal to a preset distance, it is possible to report the fact that there is a possibility of contact to the persons having an HMD installed. Furthermore, each distance can be displayed and the possibility of coming into contact can be displayed with respect to the operator who manages the overall apparatus.

Second Embodiment

Figure 5:
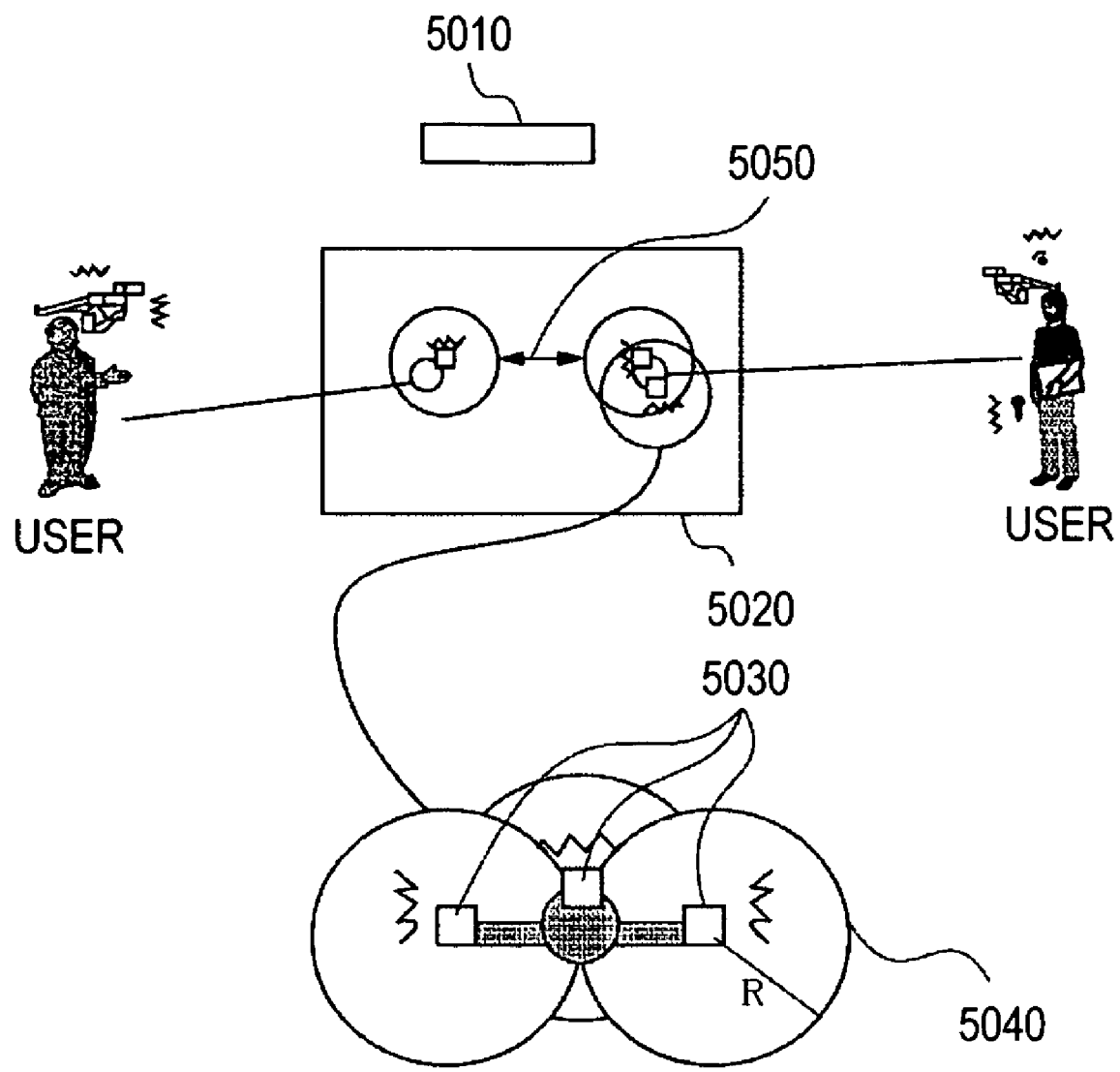
FIG. 5 shows the concept of a distance between attention areas according to the second embodiment of the present invention.

FIG. 5 shows the concept of an attention area according to a second embodiment of the present invention.

In FIG. 5, a sensor 5010 is a sensor for detecting the position and orientation of a user wearing an HMD of a mixed reality presentation system. A sensor measurement area 5020 indicates an area in which the sensor 5010 can perform measurements. A measurement object 5030 is a measurement object for which the position and orientation of the HMD of the user of the mixed reality presentation process are measured or for which the position and orientation of the hand of the user, an object installed by the user, with which the user has the possibility of coming into contact, are measured. In this embodiment, the measurement object 5030 is described as being a measurement object, but the measurement object 5030 may be a sensor or a gyro capable of measuring its own position and orientation.

An attention area 5040 is an attention area that is determined on the basis of the position of the measurement object 5030 and the threshold value set in advance in the system. A distance between attention areas 5050 is the shortest distance of the attention area for each user. In the second embodiment, a display for reporting the proximity with another user is performed to the user on the basis of the attention distance in which the value of the distance between attention areas 5050 is set in advance in the system.

The second embodiment of the present invention will be described below in detail with reference to the flowchart shown in FIG. 4 and with reference to FIG. 5.

Only the portions differing from those of the first embodiment are described below.

In step S403, it is determined whether or not the positions of the first HMD 300 and the second HMD 400 installed by the user of this apparatus is smaller than or equal to the distance between attention areas 5050 of FIG. 5. A determination is made as to the distance between attention areas by setting the attention area 5040 on the basis of a plurality of measurement objects 5030 and the position of the user and by using the distance between attention areas of each user. This attention area may be set as desired for each user, and the attention area information may be used differently depending on the physique of the user and the wearing state.

A determination is not made as to the distance between a plurality of measurement objects 5030 of the same user, and a determination is made on the basis of the attention area of a fixed distance R in which the measurement object 5030 is the center and the distance between attention areas of another user, shown in FIG. 5. The distance R for determining the size of the attention area can also be changed as desired from an operation input by the operator via an input section 700.

For the display in step S410, furthermore, image information effective for calling attention to the user, such as relative position information and a map image in which the position of the user is mapped by the objective viewpoint, can also be displayed at the same time.

For the threshold value for the distance between attention areas used for the determination, a different value may be used depending on the orientation, the moving direction, and the speed on the basis of the position and orientation of the user. In this embodiment, an embodiment of the first and second users of HMDs has been described. In addition, a third user may exist, and the proximity of the first and second users of HMDs can also be reported to the third user in the same manner as for the operator.

As described in the foregoing, according to this embodiment, since an attention area is set by considering the physique of a user, an appropriate attention area can be set.

Furthermore, since a plurality of measurement objects are set for one user, an attention area of an appropriate size can be set. Furthermore, since proximity determination is not made between measurement objects of the same user, an unnecessary process is not performed.

Third Embodiment

Figure 6:
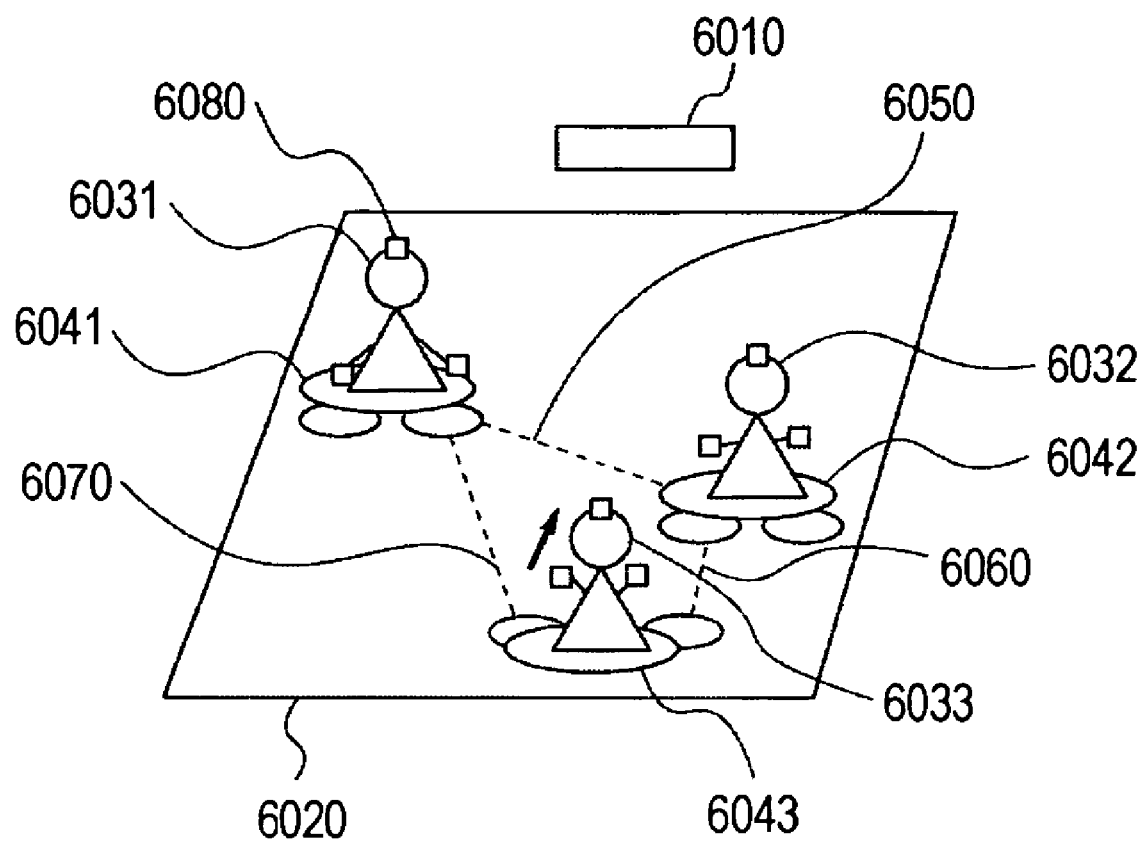
FIG. 6 shows a relative position relationship of users and the concept of a distance between attention areas according to a third embodiment of the present invention.

FIG. 6 shows the concept of an attention area according to a third embodiment of the present invention.

In FIG. 6, a sensor 6010 is a sensor for detecting the position and orientation of the user wearing an HMD of a mixed reality presentation system. A sensor measurement area 6020 indicates an area where the sensor 6010 can perform measurements.

In FIG. 6, a relative positional relationship between an HMD (not shown in FIG. 6) and three users wearing a measurement object 6080 (indicated by a rectangle in FIG. 6) is shown. That is, for a first user 6031, a second user 6032, and a third user 6033, attention areas 6041, 6042, and 6043, which are determined on the basis of a desired number of measurement objects and values of attention areas set in the system, are computed and set respectively.

For the shortest distances of these attention areas, the shortest distance between the attention area 6041 of the first user 6031 and the attention area 6042 of the second user 6032 is indicated by a distance between attention areas 6050. The shortest distance between the attention area 6042 of the second user 6032 and the attention area 6043 of the third user 6033 is indicated by a distance between attention areas 6060. The shortest distance between the attention area 6043 of the third user 6033 and the attention area 6041 of the first user 6031 is indicated by a distance between attention areas 6070.

A measurement object 6080 is a measurement object for which the position and orientation of the HMD of the user of the mixed reality apparatus are measured or for which the position and orientation of the hand of the user or the object worn by the user having a possibility of coming into contact with another user are measured. In this embodiment, the measurement object 5080 is described as being a measurement object. However, the measurement object 5080 may be a sensor or a gyro capable of measuring its own position and orientation. Furthermore, in the third embodiment, an example in which all the three users shown in FIG. 6 have worn measurement objects 6080 on the head part and both hands is described. Alternatively, the position of the measurement objects 6080 may be any position as long as these are parts of the body of the user or objects worn by the user, for which the position and orientation for determining attention areas can be measured, and the number of measurement objects 6080 may be any number.

Figure 7:
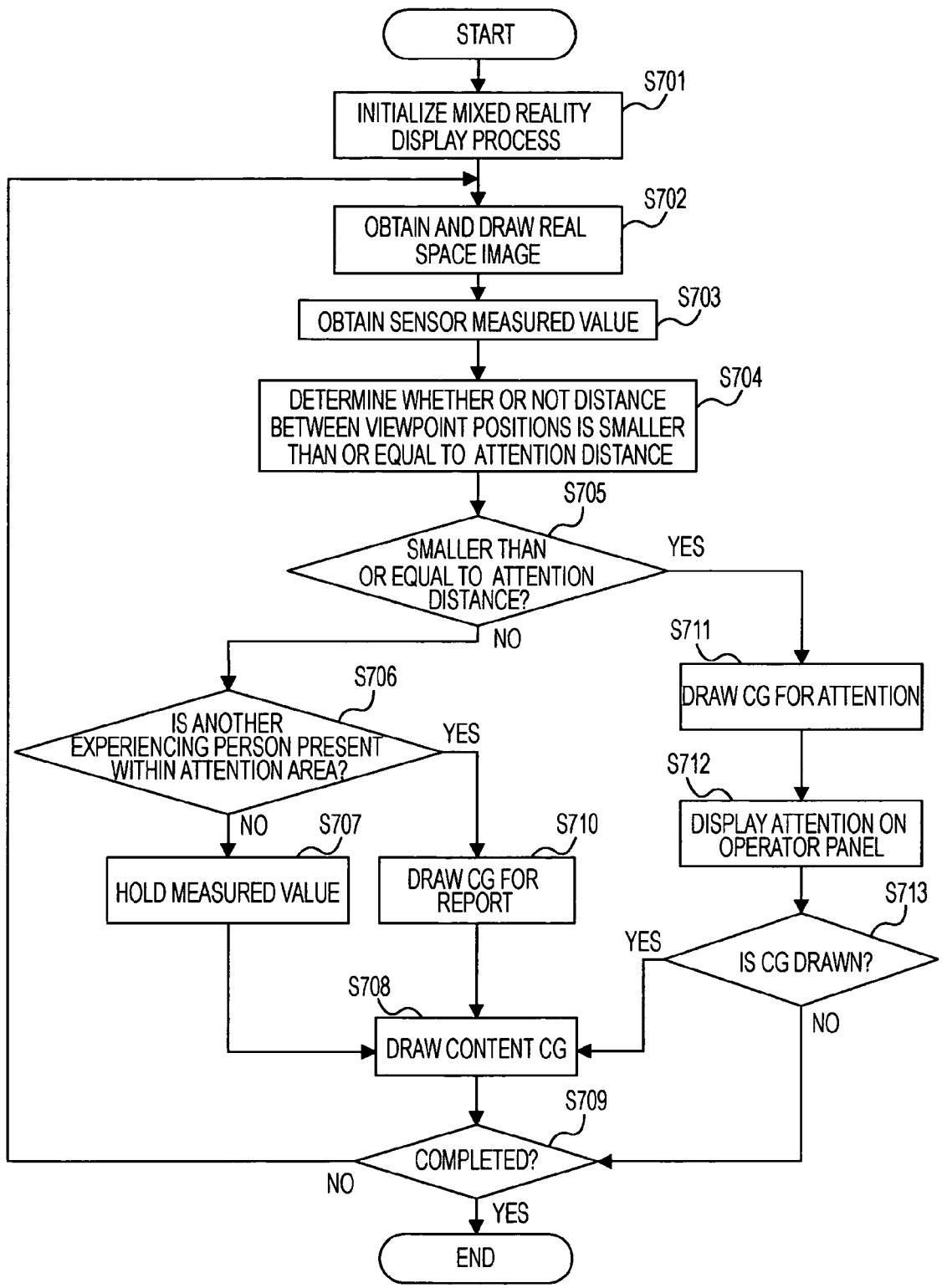
FIG. 7 is a flowchart showing a processing procedure according to the third embodiment of the present invention.

FIG. 7 is a flowchart showing a processing procedure according to the third embodiment of the present invention.

The third embodiment of the present invention will be described below in detail with reference to FIGS. 6 and 7.

In the third embodiment, the following procedure is described. Three users, that is, the first user 6031, the second user 6032, and the third user 6033, exist within the sensor measurement area. At first, all the three users exist at positions (2 m) to which no attention should be paid, in which the distance between attention areas is larger than a predetermined threshold value. Thereafter, since the third user 6033 approaches the second user 6032, the distance between attention areas 6060 between the third user 6033 and the second user 6032 becomes smaller than or equal to the threshold value (1 m or 50 cm). Proximity attention is displayed on both the HMDs of the second and third users, so that the fact that the second and third users are close to each other is reported to the first user.

In step S701, an initialization process for a mixed reality presentation process is performed. In the initialization process, for example, the CPU 101 reads data, such as virtual reality CG object data, CG object data for attention, distance between attention areas data, and program control data, into the RAM 102 from the disk unit 105.

At this point in time, parameters used in this embodiment, such as users, the size of the attention area for each measurement object of the user, and a distance between attention areas serving as a threshold value for issuing attention, are read from a file stored in the system and are held in the RAM 102.

When the initialization process of the system is completed in step S701, in step S702, the image reading unit 107 inputs a real space image from the HMD of the user of this apparatus, which is captured by the imaging devices 302, 402, and 802, and correspondingly writes them into the RAM 102.

The CPU 101 reads each image from the RAM 102 and performs a correction process as necessary. Thereafter, the CPU 101 writes the image into the frame buffer on the graphics memory of the image generating unit 103. In this case, the image input by the image reading unit 107 may be directly written into the frame buffer of the graphics memory of the image generating unit 103 without the use of the RAM 102. When optical see-through display apparatuses are used for the display apparatuses 301, 401, and 801, the process of step S702 does not need to be performed.

In step S703, the input unit 106 obtains the measured value output by the sensor control unit 300 of the sensor unit 600 (6010). The CPU 101 converts the obtained measured value into the position and orientation at the viewpoint of the user of this apparatus and writes them into the RAM 102. In step S703, the boundary measured value measured by the boundary measured value collection process in step S701 is read from the disk unit 106 and is stored in the RAM 102.

Next, in step S704, the CPU 101 compares the viewpoint position of the user, which is converted in step S703, with a group of a plurality of boundary measured values stored in the RAM 102, and determines whether or not the positions of a first HMD, a second HMD, and a third HMD worn by the user exist within the distance between attention areas of FIG. 6. A determination for this distance between attention areas is performed by setting an attention area on the basis of the position of the user wearing a plurality of measurement objects 6080 and by using the distance between the attention areas of each user.

This attention area may be set as desired for each user, and attention area information can be used differently depending on the physique of the user and the wearing state. A determination is not performed as to the distance between a plurality of measurement objects 6080 of the same user. For example, a determination is performed on the basis of the distance between the attention area surrounded by a circle determined by a fixed distance R in which the measurement object 5030 is the center and the attention area of another user. The distance R for determining the size of the attention area can also be changed as desired.

Another method may be used as long as it is a method in which an area, in which a user or an object worn by a user can be moved without contact with a margin is used, can be determined for each user for the purpose of making a determination as to the state in which proximity should be reported to the user.

In step S705, it is determined whether or not the distance between HMDs, which is computed from the first HMD, the second HMD, and the third HMD of the user, which are determined in step S704, are smaller than or equal to the distance between attention areas set in advance in the system.

Since the three users, that is, the first user 6031, the second user 6032, and the third user 6033, are at positions sufficiently apart, when the distances between attention areas 6050, 6060, and 6070 are computed on the basis of the attention areas 6041, 6042, and 6043, the distance is 2 m. Since this is greater than 1 m, which is a threshold value, attention does not need to be paid. Since attention does not need to be paid to each user with respect to the HMDs of the first, second, and third users, the process proceeds to a determination process in step S706.

In step S706, it is determined whether attention should be paid to another user or whether users are close to one another. Since any distance between attention areas of the user of the first, second, and third HMDs is not smaller than or equal to the threshold value, it is determined that proximity for which attention should be paid has not occurred with respect to the other users, and the process then proceeds to step S707.

In step S707, the measured values of the position and orientation of each of the first, second, and third users are held. In step S708, CG is drawn in such a manner as to be superimposed onto the actually captured image of the HMD of each user so as to correspond to each position and orientation. Then, if the completion of the drawing has not been instructed in step S709, the process returns to step S702, and the drawing process is continued similarly.

Next, a description is given below of a case in which the third user 6033 approaches the second user 6032 and the distance between the third user 6033 and the second user 6032; and the first user 6031 is 1 m or more, but the distance between attention areas between the second user and the third user becomes 1 m or less.

In steps S702 and S703, a process identical to the case in which the distance is greater than or equal to a threshold value is performed, and with respect to the first user 6031, the second user 6032, and the third user 6034, the same process is performed.

In step S704, also, an identical determination process is performed, but a different determination result is obtained depending on the distance of each user. That is, the determination result of the distance between attention areas of the first user 6031 is greater than or equal to 1 m, which is the threshold value, for each case.

For the determination result of the distance between attention areas of the second user 6032, the distance between attention areas 6050 with the first user 6031 is smaller than or equal to the threshold value, but the distance between attention areas 6060 with the third user 6033 is computed as being smaller than or equal to 1 m, which is the threshold value. For the third user 6033, similarly, the distance between attention areas 6070 with the first user 6031 is greater than or equal to 1 m, which is the threshold value, and the distance between attention areas 6060 with the second user 6032 is computed as being smaller than or equal to 1 m, which is the threshold value.

In the following, since processing differs for each user, a description is given of processing for each user.

In step S705, regarding the determination result of the first user 6031, the distance between attention areas with the other users is greater than or equal to 1 m, which is the threshold value, and therefore, the process proceeds to step S706. It is determined that the first user 6031 is not present within a distance for which attention should be received with respect to the other two users. However, since the other two users have come closer to within the attention distance, the process proceeds to step S710. In step S710, a drawing is performed such that the distance between attention areas between the second user 6032 and the third user 6033 is smaller than or equal to the threshold value can be reported. The display content may be displayed, for example, by text or by a model in which the first and second users are abstracted. Any display content that can be identified may be used as long as the display can be distinguished from the steady state, such as the color within the screen being changed to the same color as that of the display of the operator panel.

Next, the process proceeds to step S708, where the CPU 101 reads data of a CG object of the virtual reality from the RAM 102, draws CG from the computed viewpoint position and orientation of the user of this apparatus, and outputs the CG into the graphics memory. The image generating unit 103 combines the data drawn in various buffers of the graphics memory, that is, creates a combined image of actually captured image data, data for attention display, and a CG object to be displayed regardless of proximity attention, and sends out an image signal to the display apparatus 301.

Next, processing for the second user 6032 and the third user 6033 will be described starting from the process of step S705.

In step S704, regarding the determination result of the second user 6032, the distance between attention areas 6050 with first user 6031 is greater than or equal to 1 m, which is the threshold value, but the distance between attention areas 6060 with the third user 6033 is computed as being smaller than or equal to 1 m, which is the threshold value. Therefore, in step S705, unlike that of the first user 6031, the process proceeds to step S711, where CG for attention is drawn. This drawing may be a drawing indicating with respect to the second user 6032 that the second user 6032 is close to the third user 6033, may be a display such that the distance between the second user 6032 and the third user 6033 is indicated by a numeric value, or may be text information or a display of a simplified icon.

Next, the process proceeds to step S712, where a display indicating that the distance between the HMD of the second user 6032 and the HMD of the third user 6033 has become smaller than or equal to the threshold value is performed on the operator panel. An example is described below. The extent of the distance in which HMDs of which users have come closer to one another is displayed with respect to the operator, for example, as, in the case of 1 m or less, the color of the icon is changed from blue to orange, and the display is performed by a color that is easy to understand depending on the threshold value.

With respect to a display for the operator, any display that calls attention to the proximity of the HMD of each user and that indicates an increase in the possibility of coming into contact in a step-like manner can be applied.

Next, the process proceeds to step S713, where it is determined whether CG should be drawn.

For example, if the distance between attention areas is smaller than or equal to a first threshold value of 1 m and greater than or equal to a second threshold value of 50 cm and if the system is set in such a manner that the possibility of coming into contact due to proximity of the HMD is comparatively small, the process proceeds to step S708, where attention display is performed and the CG drawing of the content is performed, and a series of drawing process is repeated by the system. The same display is continued until the determination result of the distance between attention areas is changed.

Then, when the distance between attention areas becomes smaller than or equal to the second threshold value 50 cm, in step S711, another display image that can be distinguished from the display in the case of 50 cm to 1 m for the purpose of highlighting a higher possibility of coming into contact is drawn. Also, in the attention display to the operator in step S712, for example, the icon of the orange color is changed to red, and a drawing is performed so that the window is displayed on the foremost window. Furthermore, in step S713, the drawing of CG is not performed, and only the actually captured image and an image for attention are drawn, so that, in order for the second user 6032 to cope with proximity with the approaching third user 6033, CG drawing, which is an obstruction, is not performed as much as possible. The same drawing process is continued (processing returns to step S702) until the system ends or the determination of the distance between attention areas is changed (step S709).

The drawing process of the third user 6033 can be performed on the basis of the determination similar to that of the above-described drawing process of the second user 6032.

As a result of the drawing process of the first user 6031, the second user 6032, and the third user 6033 being continued until the completion of the drawing is instructed in step S709 by the above-described procedure, the third embodiment in the mixed reality presentation method of the present invention can be performed.

As has been described, the user of the mixed reality presentation apparatus can be appropriately guided to avoid contact due to the movement during use or the proximity of another user while the user experiences a mixed reality. At the same time, information of the possibility of contact due to proximity can be shown to the operator of the mixed reality presentation apparatus.

Furthermore, since information of a plurality of users can also be displayed to the operator, it is possible to reliably make a determination as to the state of the user from the outside.

Furthermore, since a determination is made on the basis of the distance between attention areas, which is set for each user, it is possible to absorb an error due to differences in the physique of the user.

The present invention can be achieved by supplying a storage medium storing software program code that achieves the functions of the above-described embodiments to a system or an apparatus and by enabling a computer (or a CPU or an (MPU) of the system or apparatus to read the program code stored in the storage medium and to execute the program code.

In this case, the program code itself read out of the storage medium realizes the functions of the above-described embodiments and the storage medium storing the program code can realize the present invention.

Examples of storage media supplying program code include a floppy disk, a hard disk, an optical disc, a magneto-optical disc, a compact disk-ROM (CD-ROM), a CD-recordable (CD-R), a digital versatile disk-ROM (DVD-ROM), a DVD-R, a magnetic tape, a non-volatile memory card and a ROM.

Also, in addition to the functions of the above-described embodiments being realized by the program code read out being executed on a computer, the functions of the above-described embodiments may be realized by the operating system (OS) running on the computer performing part or all of the actual processing based on instructions of the program code.

Moreover, the functions of the above-described embodiments may be realized by the program code read out from the storage medium being written to memory provided to a function expansion board inserted to the computer or a function expansion unit connected to the computer and thereafter, the CPU provided in that function expansion board or in that function expansion unit performs part or all of the actual processing based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-122369 filed Apr. 20, 2005, which is hereby incorporated by reference herein in its entirety.

What is claimed is:

1. An image processing method comprising:
    taking a real space image observed from the position and orientation of a user's viewpoint;
    detecting the position and orientation of the user's viewpoint;
    generating a combined image by combining computer graphics based on the position and orientation of the user's viewpoint with the real space image;
    providing a mixed reality by displaying the combined image to the user on a head-mounted display;
    setting a first attention area based on the physique of the user and a second attention area based on the physique of at least one other user experiencing the mixed reality;
    measuring a distance between the first attention area and the second attention area;
    determining whether the distance between the first attention area and the second attention area becomes smaller than or equal to a first predetermined value;
    for each of the at least one other user, reporting to the user that a respective one of at least one other user approaches the user when it is determined that the distance between the first attention area and the second attention area becomes smaller than or equal to the first predetermined value;
    determining whether the distance between the first attention area and the second attention area becomes smaller than or equal to a second predetermined value which is smaller than the first predetermined value after it is determined that the distance between the first attention area and the second attention area becomes smaller than or equal to the first predetermined value; and
    not combining the computer graphics with the real space image when it is determined that the distance between the first attention area and the second attention area becomes smaller than or equal to the second predetermined value.

2. The image processing method according to claim 1, wherein the type of report that a respective one other user approaches the user differs depending on the distance between the first attention area and the second attention area.

3. The image processing method according to claim 1, wherein the first predetermined value and the second predetermined value used for the determination of whether the distance between the first attention area and the second attention area becomes smaller than or equal to the first predetermined value and the second predetermined value differs depending on the orientation, the moving direction, and the speed of the user.

4. The image processing method according to claim 1, wherein reporting that a respective one other user approaches the user is made to the respective one other user.

5. The image processing method according to claim 1, wherein the report to the user is made in such a manner that computer graphics of the combined image to be displayed to the user is made to be semi-transparent depending on the distance so that the drawing of the real space is not hidden.

6. The image processing method according to claim 1, wherein the report to the user is made in such a manner that, based on the distance and the speed of the user, computer graphics of the combined image to be displayed to the user is made to be semi-transparent so that the drawing of the real space is not hidden.

7. A non-transitory recording medium having recorded thereon a program for enabling a computer to perform an image processing method comprising:

taking a real space image observed from the position and orientation of a user's viewpoint;

detecting the position and orientation of the user's viewpoint;

generating a combined image by combining computer graphics based on the position and orientation of the user's viewpoint with the real space image;

providing a mixed reality by displaying the combined image to the user on a head-mounted display;

setting a first attention area based on the physique of the user and a second attention area based on the physique of at least one other user experiencing the mixed reality;

measuring a distance between the first attention area and the second attention area;

determining whether the distance between the first attention area and the second attention area becomes smaller than or equal to a first predetermined value;

for each of at least one other user, reporting to the user that a respective one of at least one other user approaches the user when it is determined that the distance between the first attention area and the second attention area becomes smaller than or equal to the first predetermined value determining whether the distance between the first attention area and the second attention area becomes smaller than or equal to a second predetermined value which is smaller than the first predetermined value after it is determined that the distance between the first attention area and the second attention area becomes smaller than or equal to the first predetermined value; and not combining the computer graphics with the real space image when it is determined that the distance between the first attention area and the second attention area becomes smaller than or equal to the second predetermined value.

8. An image processing apparatus comprising:

an imaging unit configured to take a real space image observed from the position and orientation of a user's viewpoint;

a detection unit configured to detect the position and orientation of the user's viewpoint;

a combining unit configured to generate a combined image by combining computer graphics based on the position and orientation of the viewpoint with the real space image;

a display unit configured to provide a mixed reality by displaying the combined image to the user on a head-mounted display;

a setting unit configured to set a first attention area based on the physique of the user and a second attention area based on the physique of the at least one other user experiencing the mixed reality;

a measurement unit configured to measure distances between the first attention area and the second attention area;

a determination unit configured to determine whether the distance between the first attention area and the second attention area becomes smaller than or equal to a first predetermined value; and a reporting unit configured to report to the user, for each of at least one other user, that a respective one of at least one other user approaches the user when it is determined by the determination unit that the distance between the first attention area and the second attention area becomes smaller than or equal to the first predetermined value, wherein the determination unit is configured to determine whether the distance between the first attention area and the second attention area becomes smaller than or equal to a second predetermined value which is smaller than the first predetermined value after it is determined that the distance between the first attention area and the second attention area becomes smaller than or equal to the first predetermined value, and wherein the combining unit is configured to not combine the computer graphics with the real space image when it is determined by the determining unit that the distance between the first attention area and the second attention area becomes smaller than or equal to the second predetermined value.

* * * * *